United States Patent [19]

Miyaoh

[11] Patent Number: 5,395,127
[45] Date of Patent: Mar. 7, 1995

[54] METAL LAMINATE GASKET WITH SEALING GROMMET

[75] Inventor: Yoshio Miyaoh, Tokyo, Japan

[73] Assignee: Ishikawa Gasket Co., Ltd., Tokyo, Japan

[21] Appl. No.: 895,751

[22] Filed: Jun. 9, 1992

[30] Foreign Application Priority Data

Jun. 13, 1991 [JP] Japan .............................. 3-044421 U
Jun. 13, 1991 [JP] Japan .............................. 3-044422 U

[51] Int. Cl.⁶ .............................................. F16J 15/32
[52] U.S. Cl. .............................. 277/235 B; 277/235 R
[58] Field of Search ................. 277/235 B, 235 R, 236

[56] References Cited

U.S. PATENT DOCUMENTS

| | | | |
|---|---|---|---|
| 4,714,260 | 12/1987 | Udagawa | 277/235 B |
| 4,759,585 | 7/1988 | Udagawa . | |
| 4,807,892 | 2/1989 | Udagawa | 277/235 B |
| 4,867,467 | 9/1989 | Udagawa | 277/235 B |
| 4,898,396 | 2/1990 | Udagawa | 277/235 B |
| 5,054,795 | 10/1991 | Udagawa et al. | 277/235 B |
| 5,058,908 | 10/1991 | Udagawa | 277/235 B |

FOREIGN PATENT DOCUMENTS

| | | | |
|---|---|---|---|
| 3245383 | 6/1984 | Germany | 277/235 B |
| 0080757 | 3/1989 | Japan | 277/235 B |

*Primary Examiner*—Daniel G. DePumpo
*Attorney, Agent, or Firm*—Kanesaka & Takeuchi

[57] ABSTRACT

A metal laminate gasket of the invention is installed in an internal combustion engine with a hole to be sealed. The gasket is basically formed of first, second and third metal plates laminated with each other, and a grommet to seal around the holes of the engine. The grommet includes an upper portion and a lower portion with different lateral length. A main sealing section defined by the upper and lower portions and the first and third plates is formed around the hole of the engine, while a resilient sealing section is formed outside the main sealing section. The resilient sealing section is defined by the upper portion of the grommet, a bead on the first plate, and the second and third plates. The surface pressures at the main and resilient sealing sections can be easily controlled.

3 Claims, 1 Drawing Sheet

METAL LAMINATE GASKET WITH SEALING GROMMET

BACKGROUND OF THE INVENTION AND RELATED ART STATEMENT

The present invention relates to a metal laminate gasket with a grommet, which can seal around a hole with different surface pressures.

In a gasket, a grommet has been used widely for sealing around a hole. The grommet operates to protect a gasket material around the hole from high heat, high pressure and so on. In a metal laminate gasket formed of a plurality of metal plates, the grommet may be used to prevent fluid from entering between the plates.

In the metal laminate gasket, a bead may also be formed on a plate around the hole to be sealed, which may be compressed by flanges of the grommet. This kind of gasket is disclosed in German Publication DE 3245383 A1, U.S. Pat. Nos. 4,714,260 and 4,898,3.96.

Further, in the metal laminate gasket, in case a pressure in a hole of the engine is high, several sealing devices are formed concentrically around the hole to thereby securely seal around the hole. In this case, the sealing devices may provide different surface pressures when the gasket is compressed, so that the portions around the hole can be sealed based on the characteristics of the engine parts.

For example, in case a portion around a cylinder bore is not strong, a sealing device near the cylinder bore does not provide high surface pressure when compressed, and instead, a sealing device away from the cylinder bore provides high surface pressure. The surface pressure of the sealing devices is controlled by changing thicknesses of the plates or the wire ring, strength of the bead and so on.

In the gasket with the grommet, the grommet has been used to cover the plates around the hole. Also, the bead may be situated between the flanges of the grommet and compressed to provide surface pressure thereat. However, there has not been proposed to provide different surface pressures at the grommet.

Accordingly, one object of the invention is to provide a metal laminate gasket with a main sealing section and an auxiliary or resilient sealing section, which is formed together with a grommet.

Another object of the invention is to provide a metal laminate gasket as stated above, wherein sealing ability is not affected by movement of the engine parts.

A further object of the invention is to provide a metal laminate gasket as stated above, wherein the surface pressures around the hole can be easily controlled.

A still further object of the invention is to provide a metal laminate gasket as stated above, which can be easily and economically manufactured.

Further objects of the invention will be apparent from the following description of the invention.

SUMMARY OF THE INVENTION

In accordance with the present invention, the metal laminate gasket is used for an internal combustion engine. The gasket is basically formed of first, second and third metal plates, and a grommet.

The first plate includes a first hole corresponding to the hole of the engine, a first edge portion formed around the first hole and a bead formed around the first edge portion. The second plate includes a second hole larger than the first hole, and a second edge portion formed around the second hole. The second edge portion is located under the bead of the first plate when assembled. The third plate includes a third hole smaller than the second hole, and a third edge portion formed around the third hole.

The grommet includes a curved portion, and upper and lower portions or flanges. When assembled, the curved portion is located inside the first, second and third holes to define the cylinder bore. The upper portion is located above the first edge portion and the bead of the first plate, while the lower portion is situated under the third edge portion without extending to a base portion of the third plate.

In the gasket, a main sealing section is formed around the hole of the engine, and a resilient or auxiliary sealing section is formed outside the main sealing section. The main sealing section is defined between the upper and lower portions of the grommet, and the auxiliary sealing section is defined between the upper portion of the grommet and the base portion of the third plate. When the gasket is tightened, the main sealing section non-resiliently seals around the hole of the engine, while the resilient sealing section resiliently seals around the hole outside the main sealing section.

In the gasket of the invention, the grommet is modified such that the upper portion is longer than that of the lower portion. The main sealing section is formed between the upper and lower portions, while the resilient sealing section is formed under the upper portion outside the main sealing section. Namely, the two sealing sections are formed inside the grommet, while changing surface pressures formed thereat.

Therefore, the sealing sections are made compact around the hole to be sealed. Also, when the gasket is tightened, the tightening pressures by the bolts are concentrated at the main sealing section, and the resilient sealing section can resiliently seal around the main sealing section. The gasket can securely seal around the hole.

The main sealing section and the resilient sealing section have compressible thicknesses, or total thicknesses of the plates. The compressible thickness at the main sealing section is greater than that at the resilient sealing section. The compressible thickness outside the resilient sealing section is less than that at the auxiliary sealing section.

Preferably, the main sealing section is formed of the upper and lower portions of the grommet and the first and third edge portions of the first and third plates. The resilient sealing section is formed of the upper portion of the grommet, the bead, the second edge portion and the base portion of the third plate.

In the invention, a wire ring may be situated between the upper and lower portions of the grommet and between the curved portion and the first and third holes. The wire ring constitutes a part of the main sealing device.

DETAILED DESCRIPTION OF PREFERRED EMBODIMENTS

Figure 1:
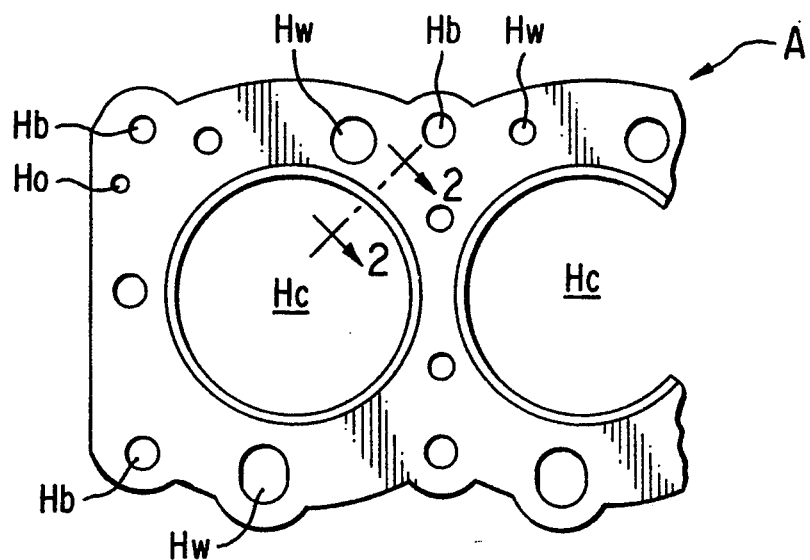
FIG. 1 is a plan view of a part of a first embodiment of a metal laminate gasket of the invention.
Figure 2:
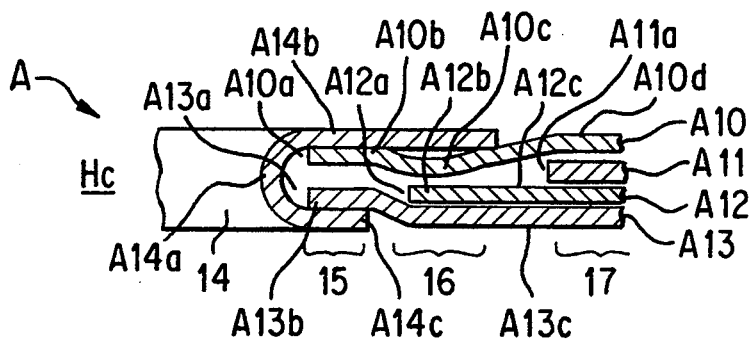
FIG. 2 is an enlarged section view taken along a line 2—2 in FIG. 1.
Figure 3:
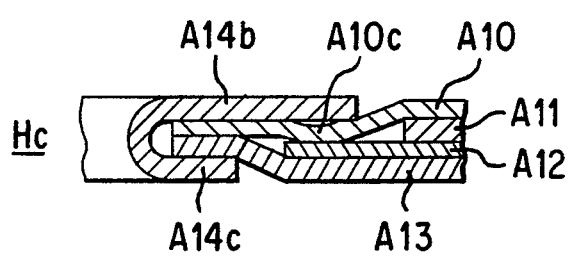
FIG. 3 is a section view for showing that the gasket shown in FIG. 2 is compressed.

Referring to FIGS. 1-3, a first embodiment A of a metal laminate gasket of the invention is shown. The gasket A is a cylinder head gasket, and includes a plurality of cylinder bores Hc, water holes Hw, oil holes Ho and bolt holes Hb, as in the conventional gasket.

Areas around the cylinder bores Hc are sealed in accordance with the present invention. Therefore, areas around the water holes Hw and the oil holes Ho are not explained. Any sealing mechanisms may be used for sealing around the water holes Hw and the oil holes Ho.

The gasket A comprises an upper plate A10, two middle plates A11, A12, and a lower plate A13, and a grommet A14. The plates A10, A11, A12, A13 substantially extend throughout the entire area of the engine.

The upper plate A10 includes a hole A10$a$ for the cylinder bore Hc, an edge portion A10$b$ around the hole A10$a$, and a bead A10$c$ to surround the hole A10$a$ outside the edge portion A10$b$. A base portion A10$d$ extends outside the bead A10$c$.

The middle plate A11 is situated under the base portion A10$d$ of the upper plate A10, and includes a hole A11$a$ larger than the grommet A14. The middle plate A12 includes a hole A12$a$, an edge portion A12$b$ to surround the hole A12$a$, and a base portion A12$c$ outside the edge portion A12$b$. The edge portion A12$b$ is located under the bead A10$c$, and the base portion A12$c$ is located under the middle plate A11.

The lower plate A13 includes a hole A13$a$, an edge portion A13$b$ formed around the hole A13$a$, and a base portion A13$c$. The base portion A13$c$ is located under the edge portion A12$b$ and the base portion A12$c$ of the middle plate A12.

The grommet A14 includes a curved portion A14$a$, and upper and lower portions A14$b$, A14$c$. The curved portion A14$a$ is located inside the holes A10$a$, A11$a$, A12$a$, A13$a$ to define the cylinder bore Hc. The upper portion A14$b$ is located above the edge portion A10$b$ and the bead A10$c$, while the lower portion A14$c$ is located under the edge portion A13$b$.

In the gasket A, a main sealing section 15 is formed by the upper portion A14$b$, the edge portions A10$b$, A13$b$ and the lower portion A14$c$, while a resilient sealing section 16 is formed by the upper portion A14$b$, the bead A10$c$, the edge portion A12$b$ and the base portion A13$c$. Also, an outer portion 17 is formed by the base portions A10$d$, A12$c$, A13$c$, and the plate A11.

When the gasket A is situated between a cylinder head and a cylinder block (both not shown) and is compressed as shown in FIG. 3, the main sealing section 15 is flattened to form a solid portion of the gasket, while the resilient sealing section 16 provides resiliency due to the bead A10$c$.

Namely, the thickness at the main sealing section 15, i.e. total thicknesses of the upper and lower portions A14$b$, A14$c$ and the edge portions A10$b$, A13$b$, is greater than the thickness at the resilient sealing section 16, i.e. total thicknesses of the upper portion A14$b$, the upper plate A10 at the bead A10$c$, the edge portion A12$b$ and the base portion A13$c$. The thickness at the outer section 17, i.e. total thickness of the plates A10, A11, A12, A13, is less than that of the resilient sealing section 16.

Therefore, when the gasket A is tightened, the main sealing section 15 non-resiliently seals around the cylinder hole Hc, while the resilient sealing section 16 resiliently seals outside the main sealing section 15. The outer section 17 is not tightly retained between the cylinder head and the cylinder block. There may be a small space at the outer section 17.

Therefore, when the gasket A is tightened, all the tightening pressures by the bolts are concentrated at the main sealing section 15 and the resilient sealing section 16. Even if the cylinder head is deformed or lifted outwardly due to insufficient rigidity of the cylinder head, the gasket can securely seal around the cylinder bores Hc.

In the gasket A, the surface pressures for sealing around the cylinder bore Hc are formed on the grommet and can be easily controlled by selecting thicknesses of the plates and the grommet.

When the gasket A is formed, for example, the grommet A14 is made of the thickest metal plate. The thickness of the middle plate A11 is less than that of the plate for the grommet A14, but greater than that of the middle plate A12. The thicknesses of the plates A10, A13 do not change throughout the entire lengths thereof. For example, the main sealing section 15 has the thickness of 1.5 mm, the resilient sealing section 16 has the thickness of 1.4 mm, and the outside section 17 has the thickness of 1.35 mm.

Figure 4:
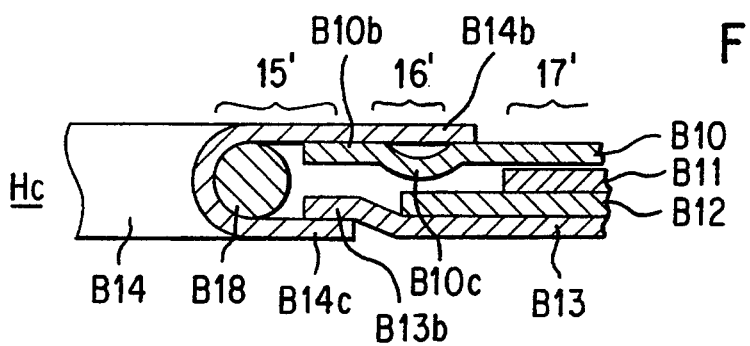
FIG. 4 is a section view, similar to FIG. 2, of a second embodiment of a metal laminate gasket of the invention.

FIG. 4 shows a second embodiment B of a metal laminate gasket of the invention. The gasket B is formed of an upper plate B10 with a bead B10$c$, middle plates B11, B12, a lower plate B13, and a grommet B14 with upper and lower portions B14$b$, B14$c$, as in the gasket A. In the gasket B, however, a wire ring B18 is further situated inside the grommet B14.

In the gasket B, a main sealing section 15' is formed of the wire ring B18 as well as the upper and lower portions B14$b$, B14$c$ of the grommet B14, and edge portions B10$b$, B13$b$ of the plates B10, B13. A resilient sealing section 16' is formed of the upper portion B14$b$, the bead B10$c$ and the plates B12, B13, while an outer section 17' is formed of the plates B10, B11, B12, B13.

When the gasket B is tightened, the wire ring B18 is compressed to a thickness that the edge portions B10$b$, B13$b$ abut against each other. Therefore, the main sealing section 15' forms a high surface pressure thereat. When the gasket B is compressed, the bead B10$c$ is not completely flattened, and provides resilient sealing pressure at the resilient sealing section 16'. The thickness at the outer section 17' is thinner than that of the resilient sealing section 16', so that the outer section 17' is not strongly compressed.

In the gasket B, the wire ring is included in addition to the structure of the gasket A, but the gasket B operates as in the gasket A.

In the gasket of the present invention, the grommet is modified to provide thereat a main surface pressure and a resilient surface pressure. An outer section of the gasket does not substantially provide surface pressure. The surface pressures formed on the gasket can be easily controlled. Also, even if the cylinder head is deformed, the tightening pressure can be concentrated around the hole to be sealed to securely seal around the hole.

While the invention has been explained with reference to the specific embodiments of the invention, the explanation is illustrative and the invention is limited only by the appended claims.

What is claimed is:

1. A metal laminate gasket for an internal combustion engine having at least one hole to be sealed, comprising, a first metal plate having a first hole corresponding to the hole of the engine, a first edge portion formed around the first hole, a bead formed around the first hole outside the first edge portion, and a first base portion formed outside the bead and extending substantially throughout an entire area of the engine, a second metal plate having a second hole larger than the first hole, a second edge portion formed around the second hole and being located under the bead without laminating the first edge portion, and a second base portion formed outside the second edge portion and situated under the first base portion, a third metal plate having a third hole smaller than the second hole, a third edge portion formed around the third hole, and a third base portion formed outside the third edge portion and situated under the second edge portion and the second base portion, a grommet having a curved portion located inside the first, second and third holes, an upper portion situated above and overlapping the first edge portion and the bead of the first plate without overlapping an entire portion of the first plate, and a lower portion situated under the third edge portion so that the lower portion does not overlap the third base portion, the second edge portion and the bead, a main sealing section formed around the hole of the engine and defined between the upper and lower portions of the grommet, said main sealing section having compressible thickness compressible when the gasket is tightened and being formed of the upper and lower portions of the grommet and first and third edge portions of the first and third plates, and a resilient sealing section formed outside the main sealing section and defined between the upper portion of the grommet and the third base portion, said resilient sealing section having compressible thickness compressible when the gasket is tightened and being formed of the upper portion of the grommet, the bead, the second edge portion of the second plate and the third base portion of the third plate, said compressible thickness at the main sealing section being greater than that of the resilient sealing section and compressible thickness outside the resilient sealing section being less than that at the resilient sealing section, said main sealing section non-resiliently sealing around the hole of the engine and the resilient sealing section resiliently sealing around the hole when the gasket is securely tightened.

2. A metal laminate gasket according to claim 1, further comprising a wire ring situated between the upper and lower portions of the grommet and between the curved portion and the first and third edges, said wire ring constituting a part of the main sealing device.

3. A metal laminate gasket according to claim 1, further comprising a fourth plate having a fourth hole larger than an outer diameter of the upper portion of the grommet, said fourth plate being situated between the first and second plates outside the upper portion of the grommet.

* * * * *